United States Patent
Kawai et al.

(10) Patent No.: US 7,672,026 B2
(45) Date of Patent: Mar. 2, 2010

(54) SHEET PRESSER AND IMAGE SCANNER

(75) Inventors: Takamitsu Kawai, Oobu (JP); Kazuhito Ishida, Ichinomiya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 407 days.

(21) Appl. No.: 10/878,531

(22) Filed: Jun. 29, 2004

(65) Prior Publication Data
US 2005/0017437 A1    Jan. 27, 2005

(30) Foreign Application Priority Data
Jun. 30, 2003    (JP)    ............................. 2003-188188

(51) Int. Cl.
*H04N 1/04*    (2006.01)
(52) U.S. Cl. ...................... 358/498; 358/474
(58) Field of Classification Search ................ 358/498, 358/474; 271/262
See application file for complete search history.

(56) References Cited

U.S. PATENT DOCUMENTS 5,825,513 A * 10/1998 Hasegawa ................... 358/498

FOREIGN PATENT DOCUMENTS

| JP | A-63-276962 | 11/1988 |
|----|-------------|---------|
| JP | A-2-238765 | 9/1990 |
| JP | A-2-238766 | 9/1990 |
| JP | A-02-305169 | 12/1990 |
| JP | U-3-53935 | 5/1991 |
| JP | A-08-331324 | 12/1996 |
| JP | A-11-341220 | 12/1999 |
| JP | A-2002-199168 | 7/2002 |
| JP | A-2002-271569 | 9/2002 |

* cited by examiner

*Primary Examiner*—Kaitlin S Joerger
(74) *Attorney, Agent, or Firm*—Oliff & Berridge, PLC

(57) ABSTRACT

A sheet presser including two pivot shaft portions fixedly disposed substantially coaxially with each other and parallel to a sheet of a document conveyed in a direction; a pressing member mounted on the shaft portions; a biasing member biasing the pressing member around the shaft portions in a direction to press the sheet; the pressing member having two elongate bearing bores each long in a direction substantially perpendicular to a surface of the sheet, which are formed in respective portions which are distant in a lateral direction of the pressing member to bear the shaft portions; and the biasing member biasing the pressing member such that at least one of the shaft portions is held in contact with one end of the bearing bore which is away from the sheet, so that an acute angle formed between the conveyance direction and the pressing member is within a predetermined range.

17 Claims, 9 Drawing Sheets

DIRECTION OF SHEET CONVEYANCE

DIRECTION OF SHEET CONVEYANCE

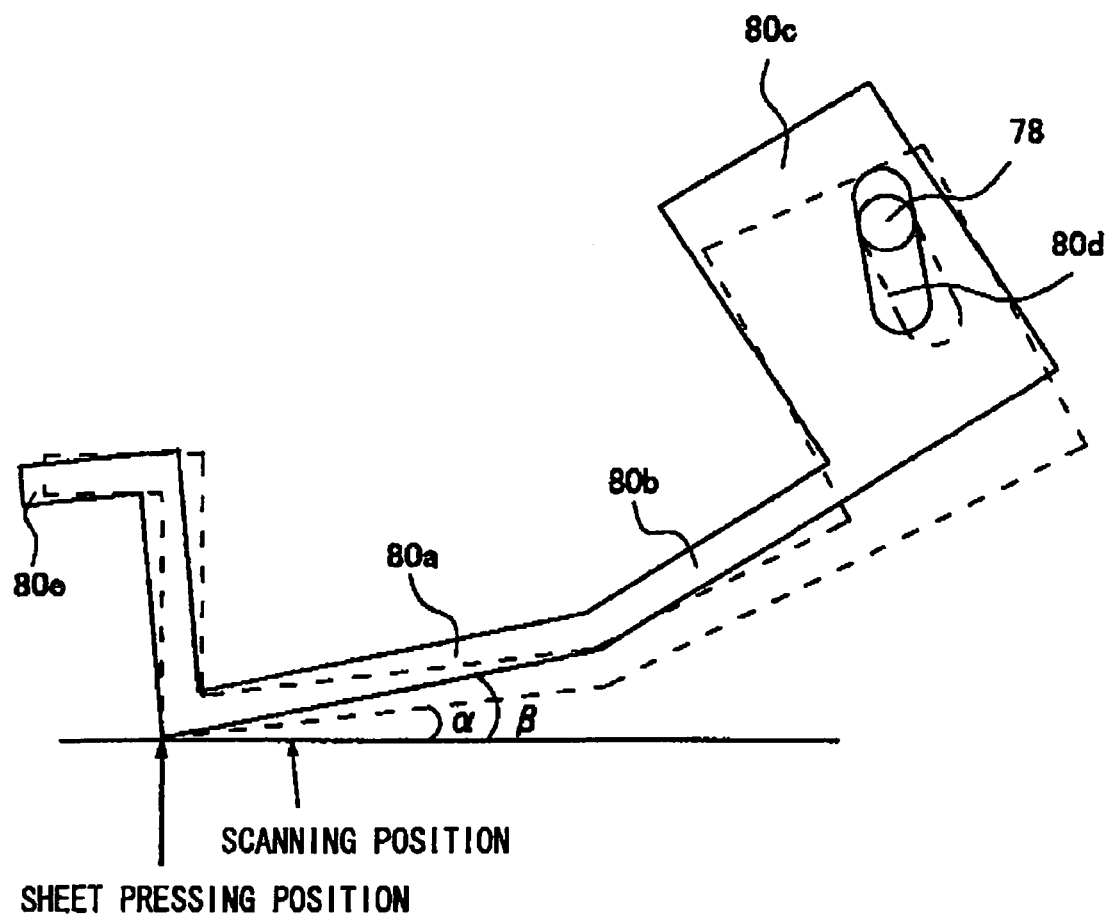

SHEET PRESSER AND IMAGE SCANNER

The present application is based on Japanese Patent Application No. 2003-188188 filed on Jun. 30, 2003, the content of which is incorporated herein by reference.

BACKGROUND OF THE INVENTION

1. Field of the Invention

The present invention relates to a sheet presser and an image scanner or a facsimile machine, a copy machine, and a character recognizer, and others.

2. Discussion of Related Art

There is conventionally known a document reader for a copy machine or facsimile machine, for example, which has a contact image sensor (CIS) or line CCD scanner. In the document reader, the CIS or CCD scanner is disposed between a pair of feed rollers for feeding in each sheet of document on which is formed an image to be scanned, and a pair of paper ejection rollers, such that the CIS or CCD scanner is oriented in a direction perpendicular to the direction in which the sheet is fed or conveyed. A surface of the sheet conveyed is irradiated by a light and reflects the light and the reflected light is sensed by the CIS or CCD scanner.

To scan the image on the sheet with sharpness, a distance from a focus of an optical system of the CIS or CCD scanner to the surface of the sheet should be held constant, and therefore a sheet pressing member for pressing the sheet onto a scanning portion of the document reader is disposed at an appropriate position.

The sheet pressing member is disposed such that the pressing member is pivotable with respect to a main body of the machine and is biased by a spring member in a direction to be held in contact with a scanning surface of the document reader. Such a document reader is disclosed in JP-A-11-341220.

SUMMARY OF THE INVENTION

However, the pressing member may suffer from uneven contact with the scanning surface due to low degrees of processing or dimensional accuracy and positional accuracy of the pressing member. In the case of such an uneven contact, part of the scanning surface corresponding to where the pressing member is not in contact with the sheet and there is a clearance therebetween, and therefore the image on the sheet can not be clearly sensed.

In particular, in a case where the pressing member is configured such that a distance from a point where the pressing member is attached to the main body of the machine to a position where the pressing member and the scanning surface are in contact with each other is made short for reducing the required cost, elastic deformability of the pressing member is lowered, thereby further increasing a possibility of occurrence of the clearance between the pressing member and the scanning surface.

The present invention has been developed in view of the above-described situations, and therefore an object of the present invention is to provide a sheet presser and an image scanner which enables to uniformly press the sheet to the supporting or imaging surface to scan the image on the sheet with sharpness over an entire surface of the sheet.

The attain the above object, a first form of a first aspect the invention provides a sheet presser comprising: two pivot shaft portions fixedly disposed substantially coaxially with each other and substantially parallel to a sheet of a document as conveyed in a predetermined direction; a pressing member pivotably mounted on the pivot shaft portions; a biasing member which biases the pressing member around the pivot shaft portions in a direction to press the sheet; the pressing member having a pair of elongate bearing bores, each of which is long in a direction substantially perpendicular to a surface of the sheet, and which are formed in respective portions which are distant in a lateral direction of the pressing member to bear the respective pivot shaft portions; and the biasing member biasing the pressing member such that at least one of the pivot shaft portions is held in contact with a remote end of the corresponding bearing bore which remote end is one of opposite ends of the bearing bore and away from the sheet, so that an acute angle formed between the predetermined direction of conveyance of the sheet and the pressing member is held within a predetermined range.

The term "two pivot shaft portions" may designate "two portions of a shaft", or "two separate shafts each having a relatively short length".

In the sheet presser according to the first form of the first aspect of the invention, the elongate bearing bores formed in the respective portions of the pressing member are long in a diction substantially perpendicular to the surface of the sheet, and the at least one pivot shaft portion is pressed onto the remote end of the elongate bearing bore which remote end is one of opposite ends of the bore away from the sheet.

Thus, the pressing member is adapted such that when one of opposite side ends of the pressing member, which are required to be held in contact with the surface of the sheet, is brought into a non-contact state due to a manufacturing error or others, the pressing member is moved by a biasing force of the biasing member applied on the pressing member so that one of the bearing bores which is diagonally located with respect to the side end in question (which is not in contact with the sheet surface) is moved upward, owing to a suitable rigidity of the pressing member, making the corresponding one of the pivot shaft portions to move in the bearing bore downward relatively to the bearing bore. In this regard, it is noted that the biasing force of the biasing member is imposed on a portion of the pressing member which is located on the side of the non-contact side end with respect to a virtual axis of swinging or turning of the pressing member which axis extends between the other side end (i.e., the side end in contact with the sheet surface) and the bearing bore diagonally located with respect to the other side end, so that the applied biasing force works to press the non-contact side end of the pressing member onto the sheet surface to assure the contact between the sheet surface and the pressing member.

Accordingly, even where otherwise the pressing member can not be uniformly held in contact with the sheet, an angle of the pressing member, with respect to the sheet can be changed in a manner as described above, so that the pressing member can be held uniformly pressed onto the sheet.

Further, in the present sheet presser, each of the pivot shaft portions is basically held pressed onto the remote end (away from the sheet) of the bearing bore which is long in the directions perpendicular to the sheet, thereby preventing the pressing member from moving toward the sheet. Therefore, the acute angle formed between the predetermined direction in which the sheet is conveyed and the pressing member is held within the predetermined range (e.g., 2.5°-5°). Accordingly, there is maintained a clearance between the sheet and the pressing member at a scanning position (shown in FIG. 6) where an image on the sheet is scanned, thereby eliminating an inconvenience that foreign matters accumulate at the scanning position, which would be otherwise caused.

Further, since the acute angle formed between the pressing member and the sheet is held within the predetermined range, the distance between the pressing member and the sheet does not become larger than a predetermined value (e.g., a focal depth of the scanning device which scans the sheet), and therefore the image on the sheet can be clearly scanned.

A second form of the first aspect of the invention provides a sheet presser comprising: two pivot shaft portions fixedly disposed substantially coaxially with each other and substantially parallel to a sheet of a document as conveyed in a predetermined direction; a pressing member having a pair of bearing bores which are formed in respective portions which are distant in a lateral direction of the pressing member, and which bear the respective pivot shaft portions; a biasing member biasing the pressing member around the pivot shaft portions in a direction into pressing contact with the sheet; and the pressing member having at least one cutout in the vicinity of each of the bearing bores.

In the above sheet presser according to the second form, since the pressing member has the at least one cutout in the vicinity of each bearing bore, a rigidity of the pressing member around the cutout can be reduced.

Therefore, even where otherwise the pressing member can not be uniformly held in contact with the sheet, the pressing member is deformed around the at least one cutout, thereby being uniformly held in contact with the sheet.

The object of the invention can be also attained by a third form of the first aspect of the invention which provides a sheet presser for pressing onto a supporting surface a portion of a sheet of a document which is being fed in a predetermined conveyance direction while the sheet being supported by the supporting surface, the portion of the sheet being elongate in the width direction of the sheet, the sheet presser comprising: a pressing member having a planar portion which is provided with a pressing surface, the pressing surface being long in the width direction of the sheet; a holding member which is disposed such that the holding member is not movable relatively to the supporting surface and which holds the pressing member such that the pressing member is pivotable about an axis which is substantially parallel to the width direction; a biasing member which biases the pressing member in a manner to have the pressing member pivot around the axis in a direction to move the pressing surface toward the supporting surface; a position of the axis relative to the supporting surface being set such that, while a contact end of the pressing surface of the pressing member held by the holding member, which contact end is one of opposite ends of the pressing surface, is held in contact with the supporting surface, there is formed a wedge-shaped space between the supporting surface and a portion of the pressing surface in the conveyance direction; and a close contact keeping device which maintains close contact between a substantially entire length of the contact end and the supporting surface by a biasing force of the biasing member, even when a parallelism between the contact end and the supporting surface in the width direction is lost due to a position error of the sheet presser relative to the supporting surface.

A first preferable mode of the sheet presser according to the third form of the first aspect further comprises: two bearing bores which are formed at respective positions in the pressing member which are spaced from each other in the width direction; two pivot shaft portions which are held by the holding member such that the two pivot shaft portions extend substantially coaxially with each other and substantially parallel to the width direction, and which are received by the two bearing bores, respectively; and the two pivot shaft portions engaging with the two bearing bores, respectively, such that one of the two pivot shaft portions engages with the corresponding bearing bore at a side part of an inner circumference of the bearing bore which is remote from the supporting surface, so that there is a clearance between the one pivot-shaft portion and another side part of the inner circumference of the bearing bore which is close to the supporting surface, and there is a clearance between the other pivot-shaft portion and a side part of the inner circumference of the corresponding bearing bore which is remote from the supporting surface, while two portions of the contact end of the pressing member which respectively positionally correspond to the two bearing bores in the width direction are in contact with the supporting surface and the wedge-shaped space is formed between the pressing surface and the supporting surface, the close contact keeping device including the clearances.

A second preferable mode of the sheet presser according to the third form of the first aspect further comprises: two pivot shaft portions which are disposed at respective positions in the pressing member which are spaced from each other in the width direction; two bearing bores which are formed in the holding member to respectively bear the two pivot shaft portions; and the two pivot shaft portions engaging with the two bearing bores, respectively, such that one of the two pivot shaft portions engages with the corresponding bearing bore at a side part of an inner circumference of the bearing bore which is close to the supporting surface, so that there is a clearance between the one pivot-shaft portion and another side part of the inner circumference of the bearing bore which is remote from the supporting surface, and there is a clearance between the other pivot-shaft portion and a side part of the inner circumference of the corresponding bearing bore which is close to the supporting surface, while two portions of the contact end of the pressing member which respectively positionally correspond to the two pivot shaft portions in the width direction are in contact with the supporting surface and the wedge-shaped space is formed between the pressing surface and the supporting surface, the close contact keeping device including the clearances.

A third preferable mode of the sheet presser according to the third form of the first aspect is such that the pressing member has a first portion at which the pressing member is held by the holding member, a second portion providing the pressing surface, and at least one elastic deformable portion between the first portion and the second portion, the at least one elastic deformable portion being elastically deformed by the biasing force of the biasing member to maintain the close contact between the substantially entire length of the contact end and the supporting surface when the parallelism between the contact end and the supporting surface in the width direction is lost due to the position error of the sheet presser relative to the supporting surface, and wherein the close contact keeping device includes the at least one elastic deformable portion.

To keep the close contact between the pressing surface and the supporting surface where the potential positional error is expected to be too large for relatively small-sized bearing bores or clearances therein to keep the dose contact, the size of the bores should be increased, to avoid an excessive force being imposed on the supporting surface or the sheet presser. However, this enlarging the bearing bores is not desirable, in view of instability and others which would be caused by such arrangement. The provision of the deformable portion according to the third preferable mode is effective for avoiding this undesirable enlargement of the bore size, since the deformable portion cooperates with the clearances defined in the bearing bores to keep the close contact between the supporting surface and the pressing surface, eliminating the necessity of enlarging the bores.

A second aspect of the invention provides an image scanner comprising: a sheet conveyor which conveys a sheet of a document in a predetermined direction; a scanning device which sans a target surface of the sheet as conveyed by the sheet conveyor; and a sheet presser according to any one of the first through third forms of the invention, which presses the target surface of the sheet onto the scanning device.

The image scanner according to the second aspect is equipped with the sheet presser according to any one of the first through third forms of the first aspect of the invention which has a pressing member which is uniformly held in contact with the sheet. Hence, the target surface of the sheet can be uniformly pressed onto the scanning device, with no clearance between the scanning device and the target surface in any part in the width direction, i.e., in the direction perpendicular to the conveyance direction. Thus, the present image scanner is capable of scanning an image on the target surface with enhanced sharpness.

BRIEF DESCRIPTION OF THE DRAWINGS

The above and other objects, features, advantages and technical and industrial significance of the present invention will be better understood by reading the folly detailed description of preferred embodiments of the invention, when considered in connection with the accompanying drawings, in which;

FIG. 6 is another explanatory view showing the operation of the sheet presser;

DETAILED DESCRIPTION OF THE PREFERRED EMBODIMENTS

Referring to the accompanying drawings, there will be described preferred embodiments of the present invention.

A sheet presser and an image scanner according to a first embodiment of the invention is installed in a multifunction apparatus equipped with multiple functions such as a print function, copy function, scanner function, facsimile function and telephone function.

Figure 1:
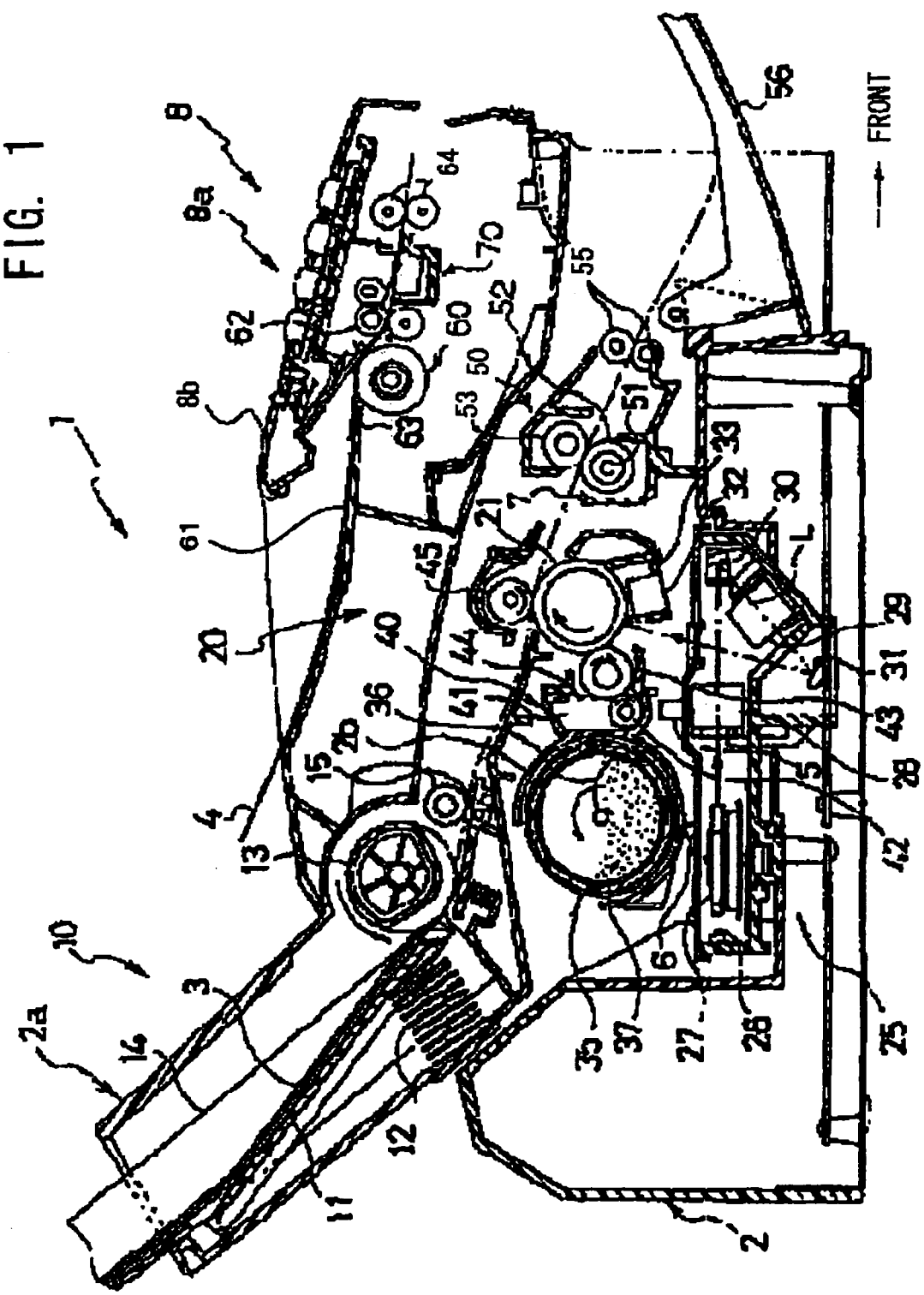
FIG. 1 is a transverse cross sectional view of a multifunction apparatus according to a first embodiment of the present invention.

FIG. 1 is a schematic diagram of the multifunction apparatus 1 which has a housing 2 incorporating a feeder unit 10, a laser scanner unit 25, a laser printer 20 having a photoconductive drum 21, an image scanner 70, a drive mechanism (not shown) for driving relevant components including the photoconductive drum 21 and various rollers, and a control unit (not shown) for controlling the multifunction apparatus 1.

The feeder unit 10 is composed such that a sheet holding plate 11 is disposed in a feeder case 2a which is disposed on the upper side of a rear portion of the housing 2, as shown in FIG. 1, with a front side end of the sheet holding plate 11 elastically biased upward by a compression spring 12. In the feeder unit 10, there is supported a feed-in roller 13 for feeding in a cut sheet or paper 3 having a standardized size. The feed-in roller 13 is adapted to be rotated by the drive mechanism (not shown) at a predetermined timing of supply of sheets.

In the feeder case 2a, there is detachably mounted in an inclined or "one-side contact" state a feeder cassette 14 capable of accommodating a plurality of the cut papers 3. When the feed-in roller 13 is rotated, the cut sheets 3 accommodated in the feeder cassette 14 is supplied or fed one by one. On the downstream side of the feed-in roller 13 in a direction of conveyance of the cut sheet 3 (from the rear side toward the front side as seen in FIG. 1), a pair of resist rollers 15 for adjusting the direction of a leading edge of the sheet 4 as fed in is rotatably mounted on a shaft supported by the feeder case 2a.

The laser printer 20 includes the photoconductive drum 21 which is a cylindrical member, the laser scanner unit 25 for forming an electrostatic latent image on the photoconductive drum 21, a toner box 35, a development unit 40 including a development roller 43, a transfer roller 45 for copying an image formed on the photoconductive drum 21 with the toner to the cut paper 3, a fixing unit 50, and a drive mechanism (not shown) for driving the photoconductive drum 21, development roller 43, etc.

The photoconductive drum 21 is a hollow member formed with a cylindrical sleeve made of aluminum on which is formed a photoconductive layer of polycarbonate in which is dispersed particles of a photoconductive resin. The photoconductive layer has a predetermined thickness (e.g., about 20 μm). The photoconductive drum 21 is rotatable supported by a shaft fixed to the housing 2. The positively charged electrostatic latent image formed on the photoconductive drum 21 is developed by reversal development with positively charged toner 37.

The laser scanner unit 25 is disposed below the photoconductive drum 21 and constituted by a semiconductor laser emitter 26 which emits a laser light L for forming the electrostatic latent image on the photoconductive drum 21, a polygon mirror 27, a pair of lenses 28, 29, a pair of reflecting mirrors 30, 31, and others. The photoconductive drum 21 is scanned with the laser light L emitted from the semiconductor laser emitter 26, so that an electrostatic latent image is formed on the photoconductive drum 21.

On the other hand, at a position on the photoconductive drum 21 on the advanced side of a scanning position (where the laser light L is irradiated) with respect to a direction of rotation of the drum 21, there is disposed an electrifier 32 of Scorotron type which includes a charge wire (such as one made of tungsten) for causing a corona discharge. Further, on the advanced side of the electrifier 32, there is disposed a neutralization lamp 33.

There will now be described the toner box 35 and development unit 40 disposed on the immediately rear side of the photoconductive drum 21.

In a casing 2b of the development unit 40 is detachably disposed the toner box 85 which is a bi-cylindrical member accommodating an agitator 36 which is driven or rotated and a toner 37 having an electric insulating property. On the front side of the toner box 35 is formed a toner storage space 41 accommodating the toner 37 supplied through a feed opening formed in the toner box 85 by the rotation of the agitator 86.

A feed roller 42 is rotatably supported in the toner storage space 41, while the development roller 43 is rotatably supported such that the development roller 43 closes the front side of the toner storage space 41 and is held in contact with the feed roller 42 as well as the photoconductive drum 21. The toner 37 is of a synthetic resin and has particle size of 7-10 μm, and the feed roller 42 and the development roller 43 are respectively made of a rubber having an electric conductivity.

On the other hand, a thickness limiting blade 44 which is formed with an elastic thin sheet of stainless or phosphor bronze is attached to the casing 2b with being directed downward, such that a bent portion armed at a lower end of the blade 44 is held in pressing contact with the development roller 43 so that a thickness of the toner 37 adhered to the surface of the development roller 43 is restricted by the thickness limiting blade 44.

Beneath the development unit 40, there is provided a cooling fan 5 which is driven to particularly cool the toner box 35, so as to prevent the toner 87 from melting and solidifying due to a rise in its temperature, and thereby to prevent deterioration in quality of the image to be produced. Beneath the toner box 35 and in close proximity to the toner box 35, there is disposed a toner temperature sensor 6 in the form of a thermistor, which detects a temperature reflecting the temperature of the toner 37.

While the photoconductive drum 21, feeder roller 42 and development roller 43 are respectively driven or rotated in respective rotation directions by the drive mechanism, particles of the toner 37 is electrically positively charged, by being impressed by and between the feeder roller 42 and the development roller 43 and due to friction between the thickness limiting blade 44 and the development roller 43 as generated when the blade 44 is pressed onto the development roller 43. The positively charged toner 37 sticks to the electrostatic latent image formed by the laser light L on the photoconductive drum 21, and the image is developed by reversal development.

The transfer roller 45 made of a rubber and having an electric conductivity is rotatably supported such that the transfer roller 45 is held in contact with the upper side of the photoconductive drum 21. The image made with the toner on the photoconductive drum 21 is transferred onto the paper 3 with stability.

The fixing unit 50 is disposed on the downstream side of the photoconductive drum 21 in the direction of conveyance of the sheet 3, and comprises a heating roller 52 incorporating a heater 51 such as a halogen lamp, and a pressing roller 53. The image made with the toner is transferred onto the underside of the paper 3 and is concurrently pressed and heated, so as to be fixed there. A heater temperature sensor 7 in the form of a thermistor is disposed in proximity to the heating roller 52, and detects surface temperature of the heating roller 52.

On the downstream side of the fixing unit 50 in the direction of the sheet conveyance are disposed a pair of conveyance rollers 55 for conveying cut papers and a catch tray 56. The feed-in roller 13, resist rollers 15, feed roller 42, development roller 43, transfer roller 45, pressing roller 53, and conveyance rollers 55 are respectively rotated by an LY motor via a gear mechanism, although this is not specifically shown in drawings.

There will be described a sheet separator 60 for conveying a sheet 4 of the document and an image scanner 70.

On the upper portion of the front side of the housing 2 is disposed an operation 1 panel 8 having a keyboard 8a including an on/off switch, a mode set switch, a numeric keypad and other various function keys, and a liquid crystal display 8b. On the under side of the operation panel 8 are disposed the sheet separator 60 for separating the sheet 4 placed on a sheet insert guide 61, and the image scanner 70 for scanning an image (information such as text and drawing) recorded on the sheet 4.

The sheet 4 placed on the sheet insert guide 61 is fed in, by a pair of sheet feed rollers 62 (i.e., a lower sheet feed roller and an upper sheet feed roller), a sheet guide 63 (or chute member) for guiding the sheet, and a pair of sheet ejecting rollers 64, to a document scanning position where image is scanned by the image scanner 70. The sheet feed rollers 62, sheet guide 63 and sheet ejecting rollers 64 constitute a conveyer for conveying a sheet 4 of a document along a conveyance path. Although it is not specifically shown, the sheet feed rollers 62 and sheet ejecting rollers 64 are respectively rotated by a sheet convey motor controlled by a control unit, via a gear mechanism.

Figures 2A, 2B:
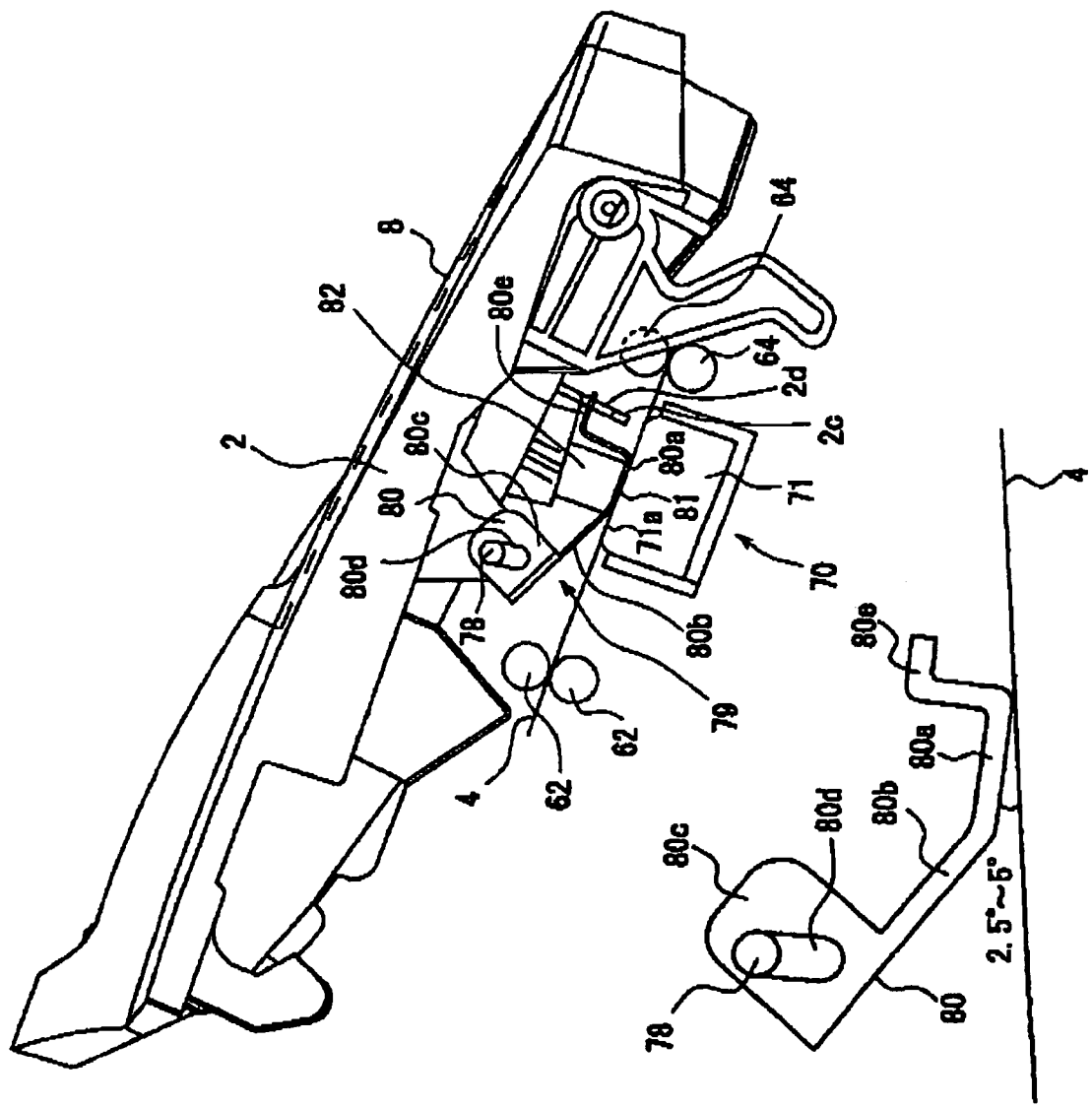
FIG. 2 is an explanatory view showing structure of a sheet presser and components in the vicinity thereof in the multifunction apparatus.

The image scanner 70 is disposed on the conveyance path, namely, on the downstream side of the sheet feed rollers 62, and has a contact image sensor 71 (scanning device) having structure similar to that of the conventional one, as shown in FIG. 2A. The image sensor 71 reads or scans an image recorded on the sheet 4 of the document, and sends image signals to the control unit.

The image sensor 71 is located under the operation panel 8, and has a length corresponding to a width (e.g. width of DIN size A4) of the sheet 4 of the document, in a direction perpendicular to the surface of sheet on which is shown FIG. 1, such that the image on the surface of the sheet 4 over the entirety thereof can be scanned. The scanning surface 71a or upper surface of the image sensor 71 is configured to have a uniform surface in the width direction of the sheet 4, or alternatively, the scanning surface 71a has a convex shape such that a substantially center portion thereof is raised than its left and right sides. For instance, the center portion of the scanning surface 71a is higher than the left and a right opposite ends thereof by about 0.3 mm.

Between the image sensor 71 and the operation panel 8 is disposed a sheet presser 79 which functions to press the sheet 4 onto the supporting or scanning surface 71a of the image sensor 71. Structure and operation of the sheet presser 79 will be later described in detail.

The control unit which controls the multifunction apparatus 1 comprises a microprocessor including a CPU, a ROM and a RAM. The ROM stores a plurality of control programs for controlling the multifunction apparatus 1 including those for controlling recording operations and scanning operations.

There will be described in detail the sheet presser 79 by referring to FIGS. 2 and 3.

As shown in FIGS. 2A and 2B, the sheet presser 79 has a pressing member 80 made of a metal for pressing the sheet 4 onto the scanning surface 71a of the contact image sensor 71. More specifically, the pressing member 80 is made of an iron sheet having a thickness of 0.5 mm.

The pressing member 80 is disposed to be opposed to the scanning surface 71a, and has a planar portion 80a or pressing the sheet 4 onto the scanning surface 71a. As shown in FIG. 2B, the planar portion 80a is disposed at angle of 2.5°-5° to the sheet 4 when seen in a direction perpendicular to the direction of conveyance of the sheet 4, and presses the back surface of the sheet (i.e., the upper surface as seen in FIG. 2) on the downstream side in the conveyance direction.

The pressing member 80 has a slant portion 80b also, which is formed continuously from the planar portion 80a on the side from which the sheet 4 is inserted and which is configured to gradually expand a section area of the path of conveyance in a direction opposite to the conveyance direction, to guide the sheet 4 toward under the planar portion 80a.

Figure 3:
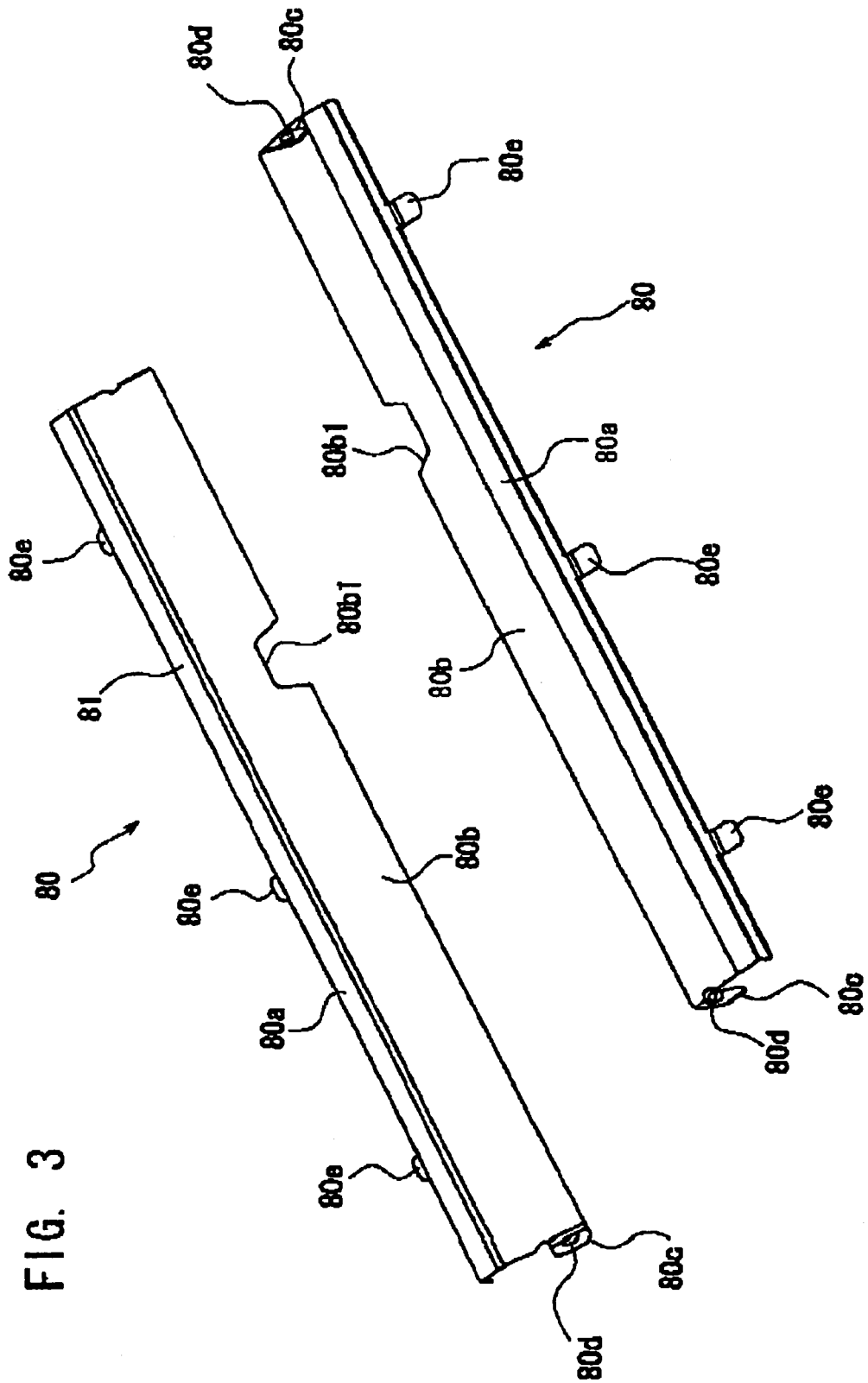
FIG. 3 is an explanatory view showing structure of a pressing member of the sheet presser.

As shown in FIG. 3, the slant portion 80b has a cutout 80b1 allowing for attachment of a sensor (not shown) for detecting the sheet 4.

The pressing member 80 has a pair of upright, bearing portions 80c at its upstream end in the conveyance direction The bearing portions 80c are disposed on the respective opposite ends of the pressing member 80 in the direction perpendicular to the conveyance direction, and have a bearing bore 80d, respectively. The bearing bore 80d has a dimension in a direction perpendicular to the surface of the sheet 4 larger than a diameter of a pivot shaft 78 which will be described later The pressing member 80 is mounted on a pair of the pivot shafts 78 attached to the housing 2, and each of the shafts 78 is rotatably supported by the bearing bore 80d. The each pivot shaft 78 is fixedly disposed to be perpendicular to the conveyance direction and parallel to the surface of the sheet.

The sheet presser 79 has a coil spring 82 as a biasing member which biases the planar portion 80a of the pressing member 80 toward the scanning surface 71a of the image sensor 71. More specifically, the coil spring 82 biases the planar portion 80a such that the pressing member 80 is pivoted around the pivot shafts 78 with an entirety thereof being pushed down, and such that the pivot shafts 78 are essentially held in contact with an upper end (an end remote from the sheet 4) of the bearing bore 80d.

A position where the coil spring 82 biases the pressing member 80 with respect to the conveyance direction corresponds to the planar portion 80a, while that position corresponds to a substantially center portion of the pressing member 80 with respect to the direction of width of the sheet. The upper end of the coil spring 82 is fixed to the housing 2.

Further, the pressing member 80 has engaging portions 80e extending from the planar portion 80a toward the downstream side in the conveyance direction. An end portion of each engaging portion 80e is caught by an engaging bore 2d formed in a frame 2c so that the engaging portion 80e is movable in the vertical direction within a certain range. This engagement relationship restricts the movable range of the pressing member 80 in the vertical direction as well as in the direction of the width of the sheet 4.

A white film 81 is adhered to the planar portion 80a (the under surface) of the pressing member 80 at at least part thereof which is opposed to the scanning surface 71a (contact image sensor 71). Therefore, whiteness of the part of the film opposed to the scanning surface 71a of the image sensor 71 is employed as a reference in checking or measuring the level of whiteness of the sheet 4. The measuring the level of whiteness of the sheet 4 is performed by the image sensor 71, in order to ensure conversion of the scanned data into black-and-white binarizing signals. Further, the planar portion 80a of the pressing member 80 has a width corresponding to that of the sheet 4 and is configured to have a concave shape with respect to the width direction which conforms to the convex shape of the scanning surface 70a.

Operation of the multifunction apparatus 1 will be described now.

In the apparatus 1 constructed as described above, the sheet 4 placed on the sheet insert guide 61 is fed toward under the scanning surface 71a of the image scanner 70 by the sheet feed rollers 62, as shown in FIG. 1.

The target or scanned surface (the under surface in FIG. 2) of the thus fed sheet 4 is pressed by the sheet presser 79 onto the scanning surface 71a of the image sensor 71, as shown in FIG. 2. That is, as described above, the pressing member 80 of the sheet presser 79 is biased by the coil spring 82 toward the scanning surface 71a, and the sheet presser 80 thereby presses the back surface of the sheet 4 downward so that an entire target or scanned surface of the sheet 4 is brought into pressing contact with the scanning surface 71a of the image sensor 71.

While passed through the image scanner 70 (or on the scanning surface 71a of the contact image sensor 71) by the rotation of the sheet feed rollers 62, the thus pressed sheet 4 is scanned, namely, the image on the sheet 4 is scanned as data by the contact image sensor 71 through the scanning surface 71a. The sheet 4 is ejected to the outside of the image scanner 70 by the rotation of the sheet ejecting rollers 64.

Although the scanning surface 71a is curved to have the convex shape with respect to the direction of width of the sheet 4, the planar portion 80a of the pressing member 80 can conform to the convex shape of the scanning surface 71a without difficulty, since the plane surface 80a (under surface) of the pressing member 80 has the concave shape corresponding to the convex shape of the scanning surface 71a. Hence, the entirety of the sheet 4 with respect to its width can be brought into close contact with the scanning surface 71a, with reliability.

There will now be described effects obtained by the sheet presser 79 and multifunction apparatus 1 according to the present embodiment. To facilitate comprehension, an undesirable inclined or "one-side contact" state where only one of opposite sides of the planar portion 80a of the pressing member 80 in the width direction of the sheet is pressed onto the scanning surface 71a is shown in exaggeration in FIG. 5, such that a clearance and others are emphasized than the actual state.

(1) In the sheet presser 79 according to the first embodiment, each of the pair of bearing bores 80d supporting the pivot shafts 78 is long in the direction perpendicular to the surface of the sheet 4, and the pressing member 80 is biased downward by the coil spring 82, as described above.

Figure 4A:
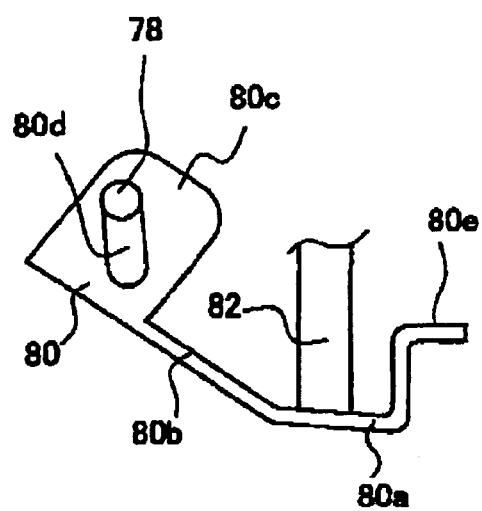
FIG. 4 is an explanatory view showing the structure of the sheet presser.
Figure 4B:
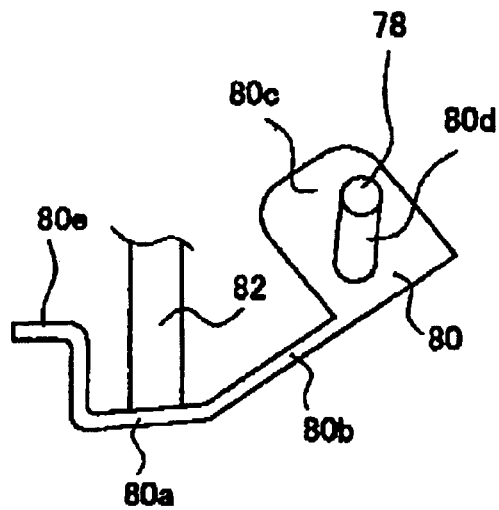

Therefore, one of the pivot shafts 78 is basically held in contact with the upper end (or end remote from the scanning surface 71a) of the bearing bore 80d which is the left-side one as seen from the downstream side of the sheet conveyance direction, as shown in FIG. 4A, while the other of the pivot shafts 78 is basically held in contact with the upper end of the bearing bore 80d which is the right-side one as seen from the downstream side of the sheet conveyance direction. Further, the pressing member 80 is pivotable around the pivot shafts 78. However, a range of angle within which the pressing member is pivotable is limited by the presence of the engaging portions 80e. It is noted that the positional relationship between the pressing member 80 and the pivot shafts 78 in the above-described basic state defines basic positions of these members.

Figure 5A:
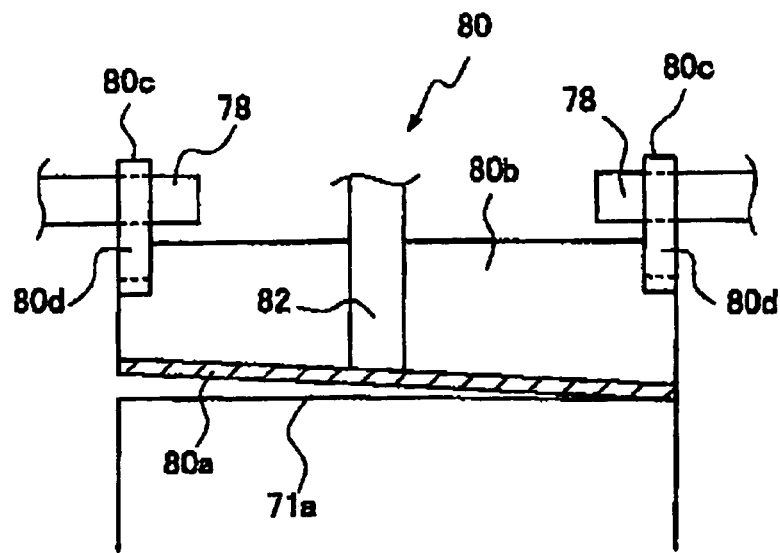
FIG. 5 is an explanatory view showing operation of the sheet presser.

In a state where the pressing member 79 is actually attached to the multifunction apparatus 1, when the pressing member 80 is held in its basic state or position, only one end of the planar portion 80a of the pressing member 80 in the direction perpendicular to the sheet conveyance direction may be pressed onto the scanning surface 71a while the other end being not in contact with the scanning surface 71a, as shown in FIG. 5A, depending upon dimensional accuracies of the components.

Figure 5B:
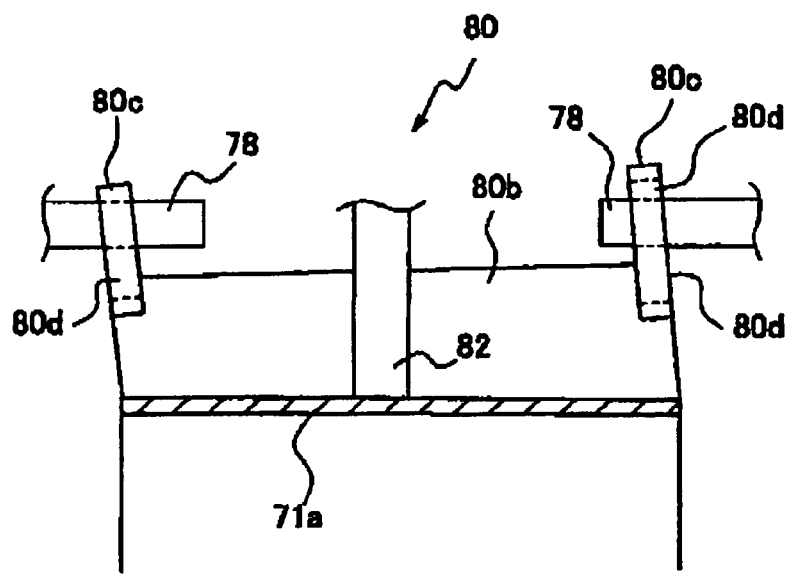

However, since the pressing member 80 is biased downward by the coil spring 82 and there is a clearance between each pivot shaft 78 and the lower end of the bearing bore 80d, the pressing member 80 pivots around the pivot shafts 78 and moves upward on the side where the pressing member 80 has been in contact with the scanning surface 71a. As a result, as shown in FIG. 5B, the planar portion 80a of the pressing member 80 and the scanning surface 71a are made parallel to each other in the direction of the width of the sheet 4, thereby uniformly bringing the planar portion 80a into contact with the scanning surface 71a.

Figure 5C:
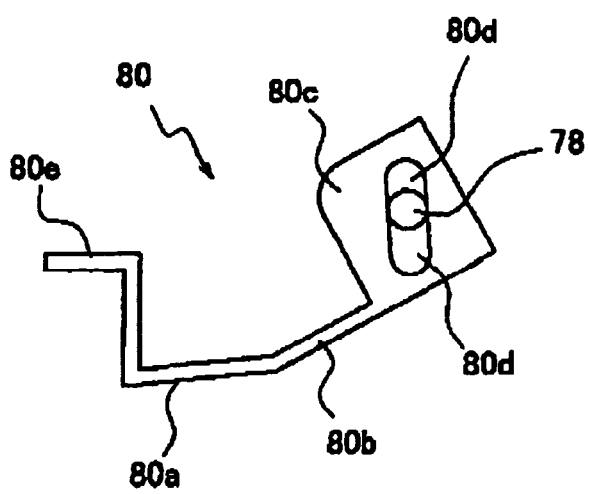

As shown in FIG. 5C, with the movement of the pressing member 80 relative to the pivot shafts 78, the one of the pivot shafts 78 on the side where the pressing member 80 has been in contact with the scanning surface 71a, is made located in the bearing bore 80d at a position lower than the upper end.

Thus, according to the first embodiment, the undesirable inclined state or "one-side contact" state where the pressing member 80 is in contact with the scanning surface 71a at only one side in the direction of the width of the sheet 4 is not permitted, and the pressing member 80 is always maintained in uniform contact with the scanning surface 71a allover its planar portion 80a, thereby pressing the sheet 4 onto the scanning surface 71a and preventing occurrence of the clearance between the sheet 4 and the scanning surface 71a. Thus the image on the sheet 4 can be scanned with enhanced sharpness.

(2) In the pressing member 80 located at its basic position, the pivot shafts 78 are held in contact with the upper end of the respective bearing bores 80d. Therefore, a direction in which the pressing member 80 can move relative to the pivot shafts 78 is solely the upward direction.

Accordingly, where an angle formed between the planar portion 80a of the pressing member 80 (indicated by a broken line in FIG. 6) and the scanning surface 71a is represented by α, while an angle formed between the planar portion 80a of the pressing member 80 (indicated by a solid line in FIG. 6) and the scanning surface 71a is represented by β, β is larger than α.

That is, according to the first embodiment, the angle between the sheet presser 80 and the scanning surface 71a is not made smaller than the certain range of angle (e.g., 2.5°-5°) even where the sheet presser 80 is displaced from the basic position.

Hence, there is formed a sufficient clearance between the pressing member 80 and the scanning surface 71a (or sheet 4) in the vertical direction at the scanning position (shown in FIG. 6) where the contact image sensor 71 scans the image on the sheet 4. Since the distance between a sheet pressing position as shown in FIG. 6 (where the pressing member 80 and the scanning surface 71a are in contact with each other) and the scanning position is 3 mm, the vertical clearance is 0.13-0.26 mm.

Consequently, even where foreign matters are conveyed along with the sheet 4 from the upstream side when the sheet 4 is fed in, the foreign matters pass through between the pressing member 80 and the scanning surface 71a, and not accumulated there, since the sufficient clearance is armed between the pressing member 80 and the scanning surface 71a (or sheet 4) at the scanning position. Hence, the image on the sheet can be scanned with enhanced sharpness, free from the adverse influence of the foreign matters.

(3) According to the first embodiment, the vertical clearance between the planar portion 80a of the pressing member 80 and the scanning surface 71a at the scanning position is 0.13-0.26 mm, as described above.

On the other hand, the focal depth of the contact image sensor 71 is about 0.5 mm. Therefore, the vertical distance between the planar portion 80a of the pressing member 80 and the Bog surface 71a at the scanning position is lower than about half the focal depth of the contact image sensor 71.

Thus, the vertical distance between the target or scanned surface of the sheet 4 (positioned between the scanning surface 71a and the pressing member 80) and the scanning surface 71a is not larger than half the focal depth of the contact image sensor 71. Accordingly, the contact image sensor 71 can scan the image on the sheet 4 with enhanced sharpness.

It is noted that the distance between the scanning surface 71a of the swig device and the pressing member 80 in the vertical direction can be reduced by decreasing the degree of the acute angle between the scanning surface 71a and the pressing member 80.

(4) The pressing member 80 made of a metal has a certain degree of rigidity, and therefore can press the sheet 4 onto the scanning surface 71a with an uniform pressing force where the planar portion 80a and the scanning surface 71a can be made parallel to each other in the direction of width of the sheet, as described above with respect to the part (1).

There will be next described a multifunction apparatus 1 according to a second embodiment of the invention, structure and operation of which are basically similar to those of the apparatus 1 according to the first embodiment, except pertain part of the structure of the sheet presser 79. This different part will be described in detail.

According to the second embodiment, a shape of each bearing bore 80d (bearing one of the pivot shafts 78) of the sheet presser 79 is a perfect circle having a diameter corresponding to the diameter of the pivot shaft 78 and the sheet presser 80 is not able to move relative to the pivot shafts 78.

Figure 7:
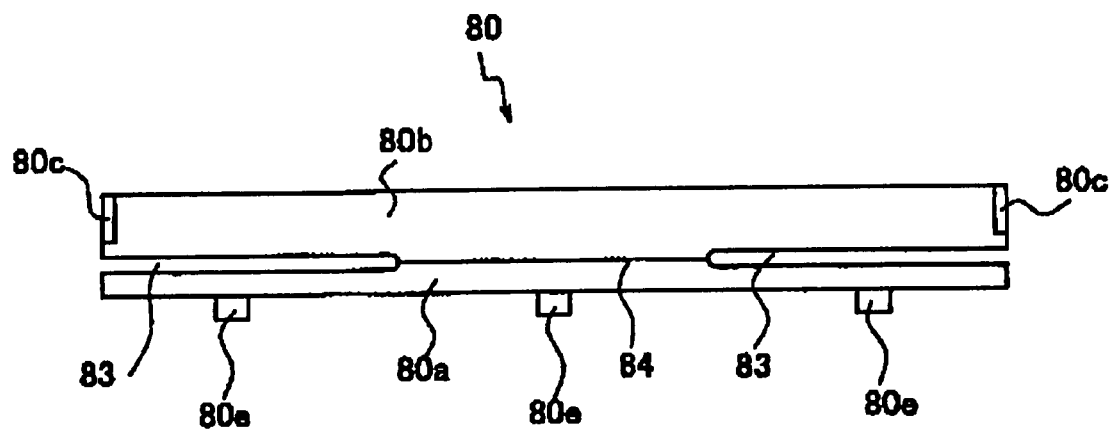
FIG. 7 is an explanatory view showing structure of a pressing member according to a second embodiment of the present invention.

In the sheet presser 79 according to the second embodiment, a pair of slits 83 are formed in the vicinity of a boundary between the planar portion 80a and the slant portion 80b of the pressing member 80, as, shown in FIG. 7. Each of the slit 83 extend in a direction perpendicular to the sheet conveyance direction from one of lateral ends of the pressing member 80 toward the center thereof, and thus a narrow portion 84 is formed between the slits 83. The pressing member 80 can be easily twisted at the narrow portion 84 around an axis extending in the sheet conveyance direction.

Figure 8A:
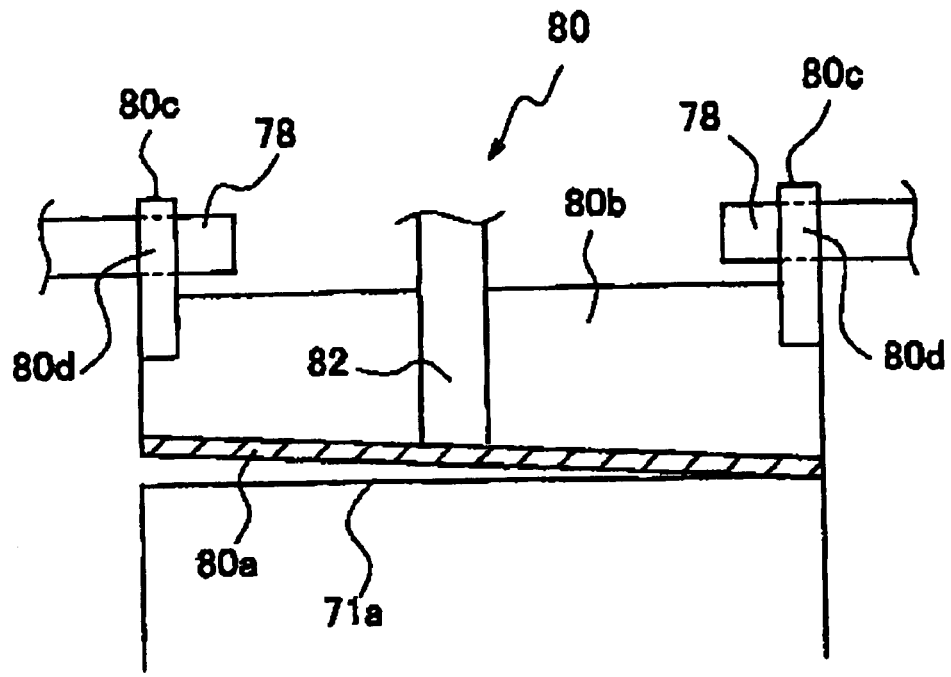
FIG. 8 is an explanatory view showing operation of a sheet presser shown in FIG. 7.
Figure 8B:
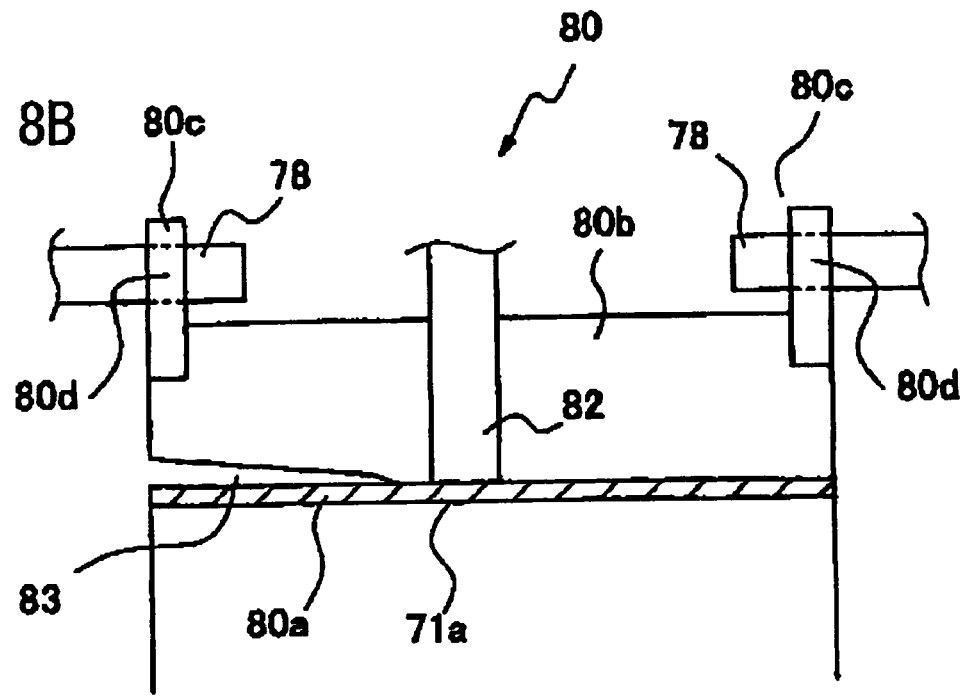

Accordingly, even where the pressing member 80 is tilted as a whole with respect to the scanning surface 71a as seen from the sheet conveyance direction, as shown in FIG. 8A, the planar portion 80a biased downward by the coil spring 82 is twisted at the narrow portion 84 around the axis extending in the conveyance direction, to become parallel to the scanning surface 71a and brought into contact with the scanning surface 71a uniformly, as shown in FIG. 8B.

As described above, according to the second embodiment, even where the pressing member 80 as a whole has not been parallel to the scanning surface 71a, the planar portion 80a is always uniformly brought into contact with the scanning surface 71a. Thus, the sheet 4 is uniformly pressed onto the scanning surface 71a and no clearance is formed between the surface of the sheet 4 and the scanning surface 71a, thereby enabling to scan the image on the sheet 4 with sharpness.

There will be described a multifunction apparatus 1 according to a third embodiment of the invention, structure and operation of which are basically similar to those of the apparatus 1 according to the second embodiment, except certain part of the structure of the sheet presser 79. This different part will be described in detail.

Figure 9:
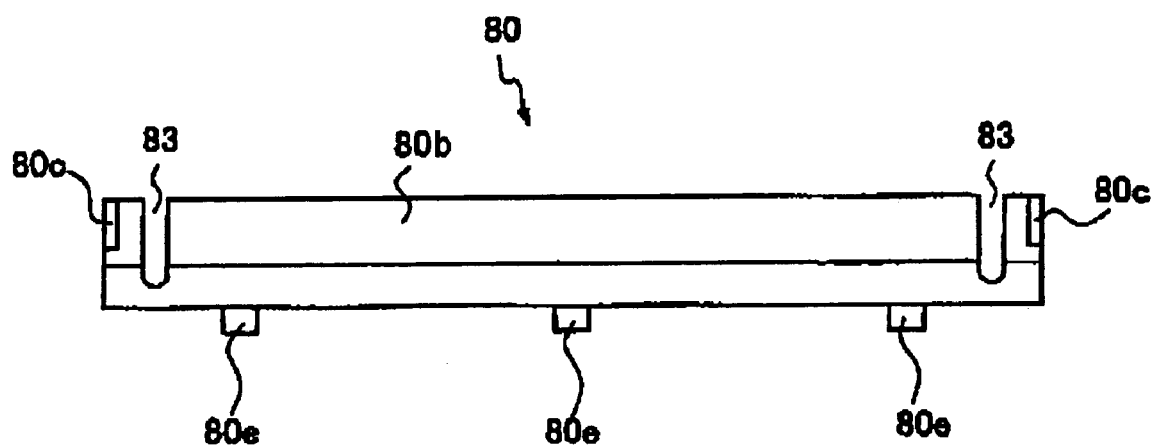
FIG. 9 is a view illustrating structure of a pressing member according to a third embodiment.

In the sheet presser 79 according to the third embodiment, two slits 83 are formed such that the slits 83 extend parallel to each other from an end of the slant portion 80b of the pressing member 80 in the sheet conveyance direction into the planar portion 80a, as shown in FIG. 9

The provision of the slits 83 reduces the rigidity of the pressing member 80, making the pressing member 80 easy to be twisted around an axis extending in the sheet conveyance direction.

Thus, even where the pressing member 80 as a whole is tilted with respect to the scanning surface 71a as seen in the sheet conveyance direction, the planar portion 80a pressed by the coil spring 82 toward the scanning surface 71a can be easily twisted and become parallel to the scanning surface 71a.

According to the third embodiment, even where the pressing member 80 as a whole has not been parallel to the scanning surface 71a, the planar portion 80a is always uniformly brought into contact with the scanning surface 71a and the sheet 4 can be thereby uniformly pressed onto the scanning surface 71a. Thus, the image on the sheet 4 can be scanned with enhanced sharpness.

There will be described a multifunction apparatus 1 according to a fourth embodiment of the invention, structure and operation of which are basically similar to those of the apparatus 1 according to the second embodiment, except certain part of the structure of the sheet presser 79. This different part will be described in detail.

The sheet presser 79 according to the fourth embodiment of the invention has, similarly to the first embodiment, the pair of bearing bores 80d each of which is long in the direction perpendicular to the back surface of the sheet, and a pair of pivot shafts 78 which are received and supported by the respective bearing bores 80d and are basically held in contact with the upper end of the respective bearing bores 80d.

Hence, in the case where the undesirable inclined or "one-side contact" state, in which only one of opposite sides of the planar portion 80a of the pressing member 80 in the width direction of the sheet is pressed onto the scanning surface 71a, takes place, the pressing member 80 moves upward, only on the side where the pressing member 80 has been in contact with the scanning surface 71a, similarly to the first embodiment. Thus, the undesirable one-side contact state is solved.

In the sheet presser 79 according to the fourth embodiment, similarly to that according to the second embodiment, the twisting of the pressing member 80 enables the uniform contact between the pressing member 80 and the scanning surface 71a.

According to the fourth embodiment which encompasses features of the first and second embodiments, the pressing member 80 can be further uniformly held in contact with the scanning surface 71a, thereby enabling to uniformly press the sheet 4 onto the scanning surface 71a. Thus the image on the sheet 4 can be scanned with enhanced sharpness.

It is to be understood that the present invention is not limited to details of the above-described embodiments, but may be embodied with various changes, modifications and improvements, which may occur to those skilled in the art, without departing from the scope and spirit of the invention as defined in the attached claims.

For instance, although each of the above-described first through fourth embodiments is application of a sheet presser and an image scanner to a multifunction apparatus, application of the invention is not limited such but the invention may be applied to a printer, a copy machine, and others.

Further, although a contact image sensor is employed as a scanning device in each of the first through fourth embodiments, the features of the invention are applicable to an image sensor (e.g., CCD sensor).

Although according to each of the first through fourth embodiments a single coil spring 82 is used, two or three or more coil springs 82 may be disposed along a line extending in a direction of the width of the sheet.

The pressing member 80 may be made of a material other than a metal, such as a resin exhibiting a rigidity of a certain degree. It is noted, however, a resin sheet which has a thickness about 0.5 mm and a rigidity substantially equal to that of the iron sheet, and warpage property of which is adequately held low, is more expensive than the metallic sheet.

What is claimed is:

1. A sheet presser, comprising:
   two pivot shaft portions fixedly disposed substantially coaxially with each other and substantially parallel to a sheet of a document as conveyed in a predetermined direction;
   a pressing member pivotably mounted on the pivot shaft portions; and
   a biasing member which biases the pressing member around the pivot shaft portions in a direction to press the sheet,
   wherein the pressing member has a pair of elongate bearing bores, each of which is long in a direction substantially perpendicular to a surface of the sheet, and which are formed in respective portions which are distant in a lateral direction of the pressing member to bear the respective pivot shaft portions; and
   the biasing member biases the pressing member such that at least one of the pivot shaft portions is held in contact with a remote end of the corresponding bearing bore which is one of opposite ends of the bearing bore and away from the sheet, so that an acute angle is formed, between the predetermined direction of conveyance of the sheet and a portion of the pressing member that contacts the sheet, when the pressing member is held within a predetermined range.

2. The sheet presser according to claim 1, wherein the pressing member is formed of a metallic sheet.

3. The sheet presser according to claim 2, wherein the pressing member has a pressing portion having a generally planar shape.

4. The sheet presser according to claim 2, wherein the pressing member includes a planar portion to be pressed to the sheet and a slant portion which is continuous from the planar portion and not brought into contact with the sheet.

5. A sheet presser for pressing onto a supporting surface a portion of a sheet of a document which is being fed in a predetermined conveyance direction while the sheet being supported by the supporting surface, the portion of the sheet being elongate in the width direction of the sheet, the sheet presser comprising:
   a pressing member having a planar portion which is provided with a pressing surface, the pressing surface being long in the width direction of the sheet;
   a holding member which is disposed such that the holding member is not movable relatively to the supporting surface and which holds the pressing member such that the pressing member is pivotable about an axis which is substantially parallel to the width direction, wherein a position of the axis relative to the supporting surface is set such that, while a contact end of the pressing surface of the pressing member held by the holding member, is held in contact with the supporting surface, there is formed a wedge-shaped space between the supporting surface and a portion of the pressing surface in the conveyance direction, the contact end being one of opposite ends of the pressing surface;
   a biasing member which biases the pressing member in a manner to have the pressing member pivot around the axis in a direction to move the pressing surface toward the supporting surface; and
   a close contact keeping device which maintains close contact between a substantially entire length of the contact end and the supporting surface by a biasing force of the biasing member, even when a parallelism between the contact end and the supporting surface in the width direction is lost due to a position error of the sheet presser relative to the supporting surface.

6. The sheet presser according to claim 5, further comprising:
two bearing bores which are formed at respective positions in the pressing member which are spaced from each other in the width direction; and
two pivot shaft portions which are held by the holding member such that the two pivot shaft portions extend substantially coaxially with each other and substantially parallel to the width direction, and which are received by the two bearing bores, respectively,
wherein the two pivot shaft portions engage with the two bearing bores, respectively, such that one of the two pivot shaft portions engages with the corresponding bearing bore at a side part of an inner circumference of the bearing bore which is away from the supporting surface, so that there is a clearance between the one pivot-shaft portion and another side part of the inner circumference of the bearing bore which is close to the supporting surface, and there is a clearance between the other pivot-shaft portion and a side part of the inner circumference of the corresponding bearing bore which is away from the supporting surface, while two portions of the contact end of the pressing member corresponding, respectively, to the two bearing bores in the width direction are in contact with the supporting surface and the wedge-shaped space is formed between the pressing surface and the supporting surface, the close contact keeping device including the clearances.

7. The sheet presser according to claim 5, further comprising:
two pivot shaft portions which are disposed at respective positions in the pressing member which are spaced from each other in the width direction; and
two bearing bores which are formed in the holding member to respectively bear the two pivot shaft portions,
wherein the two pivot shaft portions engage with the two bearing bores, respectively, such that one of the two pivot shaft portions engages with the corresponding bearing bore at a side part of an inner circumference of the bearing bore which is close to the supporting surface, so that there is a clearance between the one pivot-shaft portion and another side part of the inner circumference of the bearing bore which is away from the supporting surface, and there is a clearance between the other pivot-shaft portion and a side part of the inner circumference of the corresponding bearing bore which is close to the supporting surface, while two portions of the contact end of the pressing member corresponding, respectively, to the two pivot shaft portions in the width direction are in contact with the supporting surface and the wedge-shaped space is formed between the pressing surface and the supporting surface, the close contact keeping device including the clearances.

8. The sheet presser according to claim 5, wherein the pressing member has a first portion at which the pressing member is held by the holding member, a second portion providing the pressing surface, and at least one elastic deformable portion between the first portion and the second portion, the at least one elastic deformable portion being elastically deformed by the biasing force of the biasing member to maintain the close contact between the substantially entire length of the contact end and the supporting surface when the parallelism between the contact end and the supporting surface in the width direction is lost due to the position error of the sheet presser relative to the supporting surface, and wherein the close contact keeping device includes the at least one elastic deformable portion.

9. The sheet presser according to claim 6, wherein the pressing member has a first portion at which the pressing member is held by the holding member, a second portion providing the pressing surface, and at least one elastic deformable portion between the first portion and the second portion, the at least one elastic deformable portion being elastically deformed by the biasing force of the biasing member to maintain the close contact between the contact end and the supporting surface in cooperation with the clearances when the parallelism between the contact end and the supporting surface in the width direction is lost due to the position error of the sheet presser relative to the supporting surface, and wherein the close contact keeping device includes the at least one elastic deformable portion.

10. The sheet presser according to claim 7, wherein the pressing member has a first portion at which the pressing member is held by the holding member, a second portion providing the pressing surface, and at least one elastic deformable portion between the first portion and the second portion, the at least one elastic deformable portion being elastically deformed by the biasing force of the biasing member to maintain the close contact between the contact end and the supporting surface in cooperation with the clearances when the parallelism between the contact end and the supporting surface in the width direction is lost due to the position error of the sheet presser relative to the supporting surface, and wherein the close contact keeping device includes the clearances and the at least one elastic deformable portion.

11. The sheet presser according to claim 8, wherein the first portion has two held portions which are spaced from each other in the width direction and at which the pressing member is held by the holding member; and the pressing member has at least a pair of slits which extends substantially parallel to the width direction from a pair of ends of the pressing member which ends are opposite in the width direction, toward a central portion of the pressing member, and the central portion left between the at least a pair of slits provides the at least one elastic deformable portion and permits the contact end to be twisted with respect to the two held portions around an axis extending substantially parallel to the conveyance direction.

12. The sheet presser according to claim 8, wherein the first portion has two held portions which are spaced from each other in the width direction and at which the pressing member is held by the holding member, and the two held portions and the second portion providing the pressing surface are connected via two connecting portions extending in a direction substantially perpendicular to the width direction, the connecting portions providing the at least one elastic deformable portion and permitting the close contact between the contact end and the supporting surface by an elastic bending deformation of the connecting portions.

13. The sheet presser according to claim 12, wherein the first portion has two held portions which are respectively disposed at opposite ends of the pressing member which are opposite in the width direction, such that the two held portions are respectively spaced from the second portion in the direction perpendicular to the width direction; and the pressing member has a pair of slits which are formed in the vicinity of the respective two held portions, such that the pair of slits extend substantially perpendicular to the width direction from an end of the pressing member which is remote from the second portion, the connecting portions being constituted by two portions of the pressing member which are located outward of the respective slits in the width direction.

14. An image scanner comprising:
the sheet presser according to claim 5;
a sheet conveyor which conveys the sheet of the document in the predetermined direction; and
a scanning device which scans a target surface of the sheet as conveyed by the sheet conveyor,
wherein the sheet presser presses the target surface of the sheet onto the scanning device.

15. The image scanner according to claim 14, wherein a vertical distance between a scanning surface of the scanning device and the pressing member, at a scanning position where the scanning device scans the target surface of the sheet, is smaller than a focal depth of the scanning device.

16. The image scanner according to claim 14, wherein the scanning device includes a contact image sensor.

17. The sheet presser according to claim 5, wherein the contact end of the pressing surface of the pressing member is one of the opposite ends of the pressing surface on the downstream side with respect to the conveyance direction, and the portion of the pressing surface between which and the supporting surface is formed the wedge-shaped space is located upstream of the contact end with respect to the conveyance direction.

* * * * *